Oct. 13, 1936.  R. W. SCHLUMPF  2,057,209

METHOD OF MAKING A HARD FACED CUTTER

Filed Jan. 26, 1935

Robert W. Schlumpf
INVENTOR

BY Jesse R. Stone
ATTORNEY

Patented Oct. 13, 1936

2,057,209

UNITED STATES PATENT OFFICE 2,057,209

METHOD OF MAKING A HARD FACED CUTTER

Robert W. Schlumpf, Houston, Tex., assignor to Hughes Tool Company, Houston, Tex., a corporation of Texas Application January 26, 1935, Serial No. 3,580

2 Claims. (Cl. 76—108)

This invention relates to the hard facing of well drills. It has its principal application to well drills of the fish tail or drag bit type of well drills where the bit cuts with a scraping or shearing action, and although the invention is not confined to use upon any particular type of well drill, I have shown it applied to a fish tail drill.

It is an object of the invention to provide a simple and effective method of applying hard facing or abrasive material to a cutting member. It has been common to secure hard facing, or wear resisting material to a cutting blade by several methods. The material may be welded in stick form directly upon the blade by fusing the hard material and depositing it directly to the blade, as where such material as Stellite is used. The hard material may also be placed upon the blade and fused in place by a welding torch without the addition of extra metal; or the hard material may be held in place on the blade by a layer of welded on metal. The best kinds of hard facing material such as tungsten carbide inserts are not easily handled by any of these methods and my invention is designed to apply the hard facing more easily and satisfactorily.

It is also desired to form a fish tail bit wherein the hard faced edge may be replaced as a complete unit when desired.

A further object is to so construct the bit that it will be cleared of material tending to clog about the cutting edge and interfere with its drilling action.

In the drawing herewith, Fig. 1 is a front view, partly in longitudinal section, showing the construction of a drill bit embodying the invention.

Figure 1:
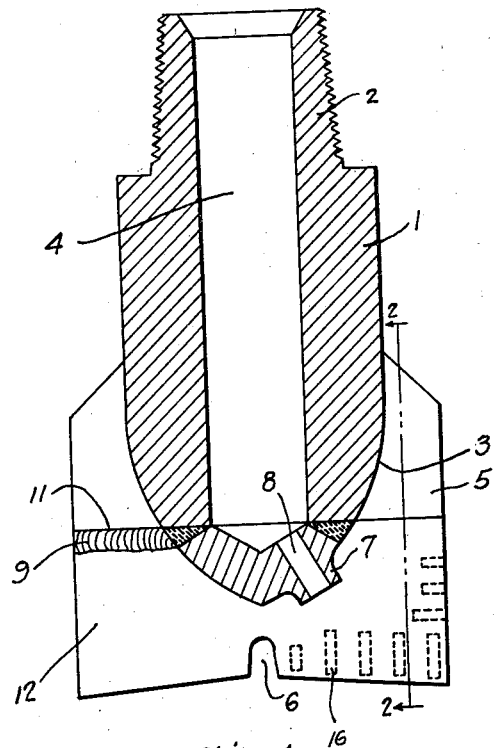
Figure 2:
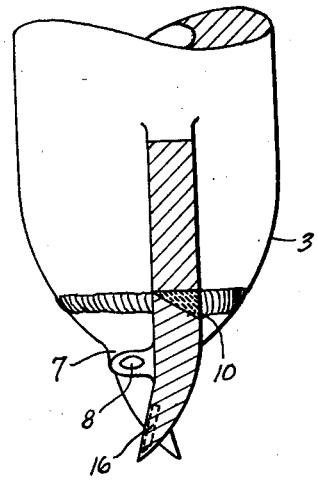
Fig. 2 is a broken side view partly in section on the plane 2—2 of Fig. 1.

The body 1 of the bit here shown is preferably approximately cylindrical. It has an upper shank 2 threaded for attachment to the drill collar or coupling, not shown. The lower end 3 of the head is rounded off to a bluntly tapered point. The interior of the head is provided with a cylindrical chamber 4 to receive the flushing fluid.

The cutting blade 5 projects from opposite sides of the head and extends materially below the lower end of said head. Said blade is divided at an intermediate point between its sides by a short recess 6 and the portion of the blade at one side of the division point is curved forwardly in one direction and the edge at the other side is curved in the opposite direction; each side being thus curved in the direction of rotation in the usual manner.

The lower end of the fluid chamber or passage 4 is provided with fluid outlets 8, one on each side of the blade. Said outlets extend through bosses or thickened portions 7 formed on the end of the head and inclined to one side to discharge fluid from the outlet across the forward face of the cutting portion of the blade.

The lower end of the blade and of the head is preferably made detachable. This is accomplished by forming the forward end separately and securing it to the upper portion by a bond 9 of welding material, preferably a good quality of steel. Thus the upper end of the detachable section is beveled off at 10 to leave room to receive the welded material permitting the attachment of the parts along the line 11.

Figure 3:
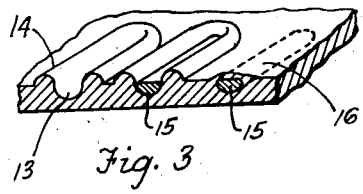
Fig. 3 is a broken perspective view showing the manner of applying hard facing inserts to the blade.

The forward face of each cutting area is provided with inserts of hard material such as tungsten carbide to resist abrasion in use. In the original forging or casting of the blade and more particularly the forward detachable portion 12 grooves or recesses 13 are formed in the edge of the blade at the end and side thereof. In Fig. 3 the grooves 13 are shown as surrounded by a slight ridge of metal 14. This ridge is formed in the manner shown to provide material or stock in the blade to fill in around the inserts 15. In applying the inserts the insert 15 is placed in position in the groove and heat is then applied by means of an electric arc or by a welding torch so as to fuse the material of the blade which is of lower fusion point relatively to the hard insert. The metal of the ridge 14 is caused to flow in about the insert and imbed said insert in the face of the blade as is shown at 16 in the figures. Thus no new metal need be applied and yet the insert is imbedded firmly in the face of the blade without the melting of the insert. The hard material is thus fixed accurately in its position spaced from other similar inserts so as to obtain the structure desired. As will be noted this method has many advantages over the old method of distributing a granular material over the face of the blade and then fusing the material of the flat face of the blade so that the hard material will be mudded into the surface and project therefrom irregularly.

My improved bit has the advantages of wearing for long periods without refacing and that the repairs may be quickly made when desired by cutting away the bond of welding material 9 which secures the cutting edge to the body of the bit and blade and securing another in position by another bond of similar material.

The flushing fluid is directed at an angle across the face of the blade so as to best clear the cutting edge of material as the material is scraped from the bottom and sides of the well. Further the rounded face of the bit body will tend to fill up the hole being drilled and cause a speedier upward flow of the flushing fluid about the drill and thus keep the mud from clogging about the bit.

While inserts of unitary construction are shown, it is to be understood that hard material in any desired form may be placed in the grooves 13 and imbedded therein in the manner described.

What is claimed as new is:

1. The method of hard facing the cutting blade of a drill bit comprising; forming grooves in the forward face of the blade, providing a ridge of material about said grooves, the material of said blade and ridge being homogeneous, placing inserts of hard material and relatively high melting point in said grooves, melting the material of said ridges and flowing the same about said inserts to imbed the said inserts in said grooves.

2. A method of securing hard facing inserts in the cutting edge of a drill bit including forming grooves in said blade and ridges of material adjacent said grooves, placing said inserts in said grooves, fusing the material in said ridges and flowing said fused material about said inserts and allowing said fused material to harden about said inserts.

ROBERT W. SCHLUMPF.